Sept. 5, 1967           D. ATLAS           3,340,528
METHOD AND SYSTEM FOR WIND MEASUREMENTS
Filed Feb. 18, 1965           2 Sheets-Sheet 1
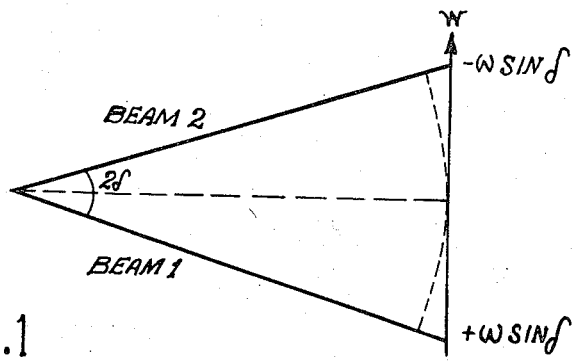
FIG.1
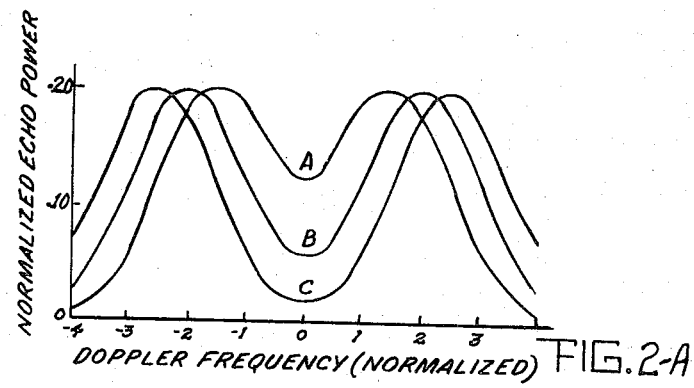
FIG.2-A
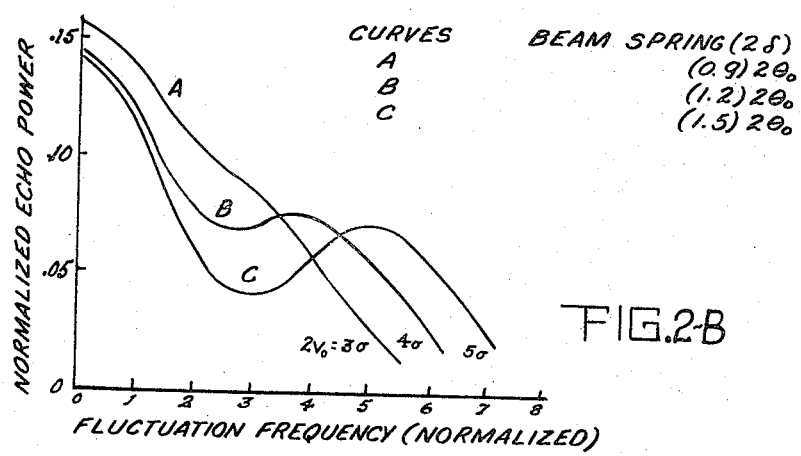
FIG.2-B
INVENTOR.
DAVID ATLAS
BY Harry A. Herbert Jr.
George Fine
ATTORNEYS INVENTOR.
DAVID ATLAS
BY Harry A. Herbert Jr
George Fine
ATTORNEYS

United States Patent Office 3,340,528
Patented Sept. 5, 1967

3,340,528
METHOD AND SYSTEM FOR WIND MEASUREMENTS
David Atlas, Newton, Mass.
(828 Chestnut St., Waban, Mass. 02168)
Filed Feb. 18, 1965, Ser. No. 433,820
19 Claims. (Cl. 343—8)

The invention described herein may be manufactured and used by or for the United States Government for governmental purposes without payment to me of any royalty thereon.

The present invention relates to method and system for wind measurement and more particularly the use of multiple radar beams from a single radar to obtain return signals representative of the cross-wind component and also permitting simultaneous measurement of both tangential and radial wind components, thus the exact wind velocity vector.

The remote measurement of wind is of obvious importance in a variety of meteorological problems. Doppler or coherent radars have recently come into increasing use use for the measurement of particle motions in storms and thus of the winds with which they are borne. But such Doppler radars are costly and not widely available. Furthermore the maximum velocity which can be measured unambiguously by means of a pulsed Doppler radar (capable of ranging on the targets of interest or mapping them) is severely limited by the pulse repetition frequency (PRF) so that $v_{max} = \lambda$ (PRF)/4, where $\lambda$ is the wavelength. The present invention provides a means whereby ordinary incoherent radar may be utilized to measure winds and to overcome the limitation on the measurement of high winds imposed by the PRF. However, it may also be applied to a Doppler radar thus permitting the measurement of the tangential (cross-wind) component which, together with the normally measured radial component, completely determines the actual wind vector.

An object of the present invention is to provide a method and system for measurement of winds wherein multiple beams emanating from a single radar are utilized to obtain a unique beat frequency corresponding to the cross-wind component and thereby permitting use of a conventional (non-Doppler) radar. Another object of the present invention is to provide a method and system utilizing multiple beams from a single Doppler radar to permit simultaneous measurement of both tangential and radial wind components, and thus wind velocity vector.

Yet another object of the present invention is to provide a system for measuring wind velocity by a single radar.

Still another object of the present invention is to provide a method and system for utilizing vertically pointing radars to measure winds overhead.

A still further object of the present invention is to provide a method and system for measuring hurricane winds from ground or airborne radars without penetrating the storm.

Yet a further object of the present invention is to provide a method and system for detecting tornado winds.

An important object of the present invention is to provide a method and system for determining aircraft velocity.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated and described preferred embodiments of the invention.

Of the drawings:

FIGURE 1 is a schematic representation of the multiple beam principle;

FIGURE 2a illustrates the combined Doppler spectrum for multiple beams;

FIGURE 2b illustrates the fluctuation spectrum of multiple beams;

Figure 3:
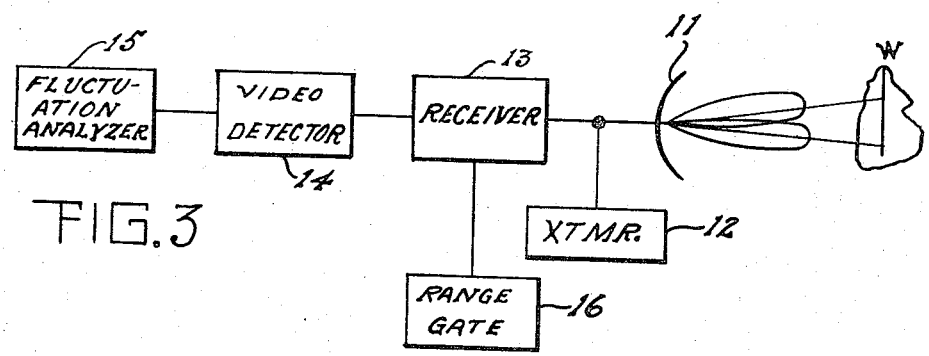
FIGURE 3 shows a diagram, partly in block form, showing the general dual beam radar embodiment for cross-wind measurement.

The concept of the present invention is illustrated in FIGURE 1. Here there is seen two radar beams, infinitely thin for illustrative purposes) whose axes are separated by anble $2\delta$. Both beams are fed from the same transmitter and their return signals are fed to a single receiver. The axis of the beam pair is directed perpendicularly to the wind direction as shown so that targets in beam 1 moving with wind W produced Doppler shift $$f_1 = \frac{(2W \sin \delta)}{\lambda} \approx \frac{(2W\delta/\lambda)}{}$$

(for small angles) while similar targets (clouds, precipitation, etc.) in beam 2 produce equal negative shifts, $f_2 = -f_1$. While the individual shifts are not detectable by incoherent radar, they beat with one another at the second detector to produce a signal which fluctuates with frequency $F = f_1 - f_2 = 4W\delta/\lambda$. Thus the fluctuation frequency is a unique measure of the wind W. Note that even for a strong wind of $W = 50$ m/sec., the fluctuation frequency F corresponding to a beam spacing $2\delta = 5$ deg. at a wavelength of 10 cm. is only about 80 c.p.s., well below the typical limiting value of PRF/2 (half the pulse repetition frequency).

In the case of infinitely narrow beams, half of the total echo power is returned at a Doppler frequency $f_1$ and half at frequency $f_2$. However, if the radar is incoherent and the Doppler spectrum is not measurable, then those signals returning along beam 1 will beat with those arriving along beam 2. The detected signal will then fluctuate in amplitude with a frequency $F = f_1 - f_2$ around some average level or D.C. component to provide a "fluctuation spectrum."

Analytically, the signal returned on beams 1 and 2 may be expressed by $A_1 = a_1 e^{-1(w_0 - w_1)t}$ and $A_2 = a_2 e^{-1(w_0 - w_2)t}$, respectively, where $a_1$ and $a_2$ are the reflected maximum amplitudes on each beam, $w_0 = 2\pi f_0$ where $f_0$ is the transmitted carrier frequency, and $w_1 = 2\pi f_1$ and $w_2 = 2\pi f_2$ where $f_1$ and $f_2$ are the respective Doppler frequencies on the two beams. After phase detection or heterodyning in the Doppler radar, the total detected signal amplitude has the form $$A = a_1 \cos 2\pi f_1 t + a_2 \cos 2\pi f_2 t \qquad \text{(Eq. 1)}$$

When passed through a spectrum analyzer this waveform is seen to have power $a_1^2$ at frequency $f_1$ and $a_2^2$ at frequency $f_2$. Thus, if the reflections on both beams are equal (i.e., $a_1^2 = a_2^2$), the power is divided equally in just two lines, one at Doppler frequency $f_1$ and the other at $f_2$. This is the Doppler spectrum.

In the case of an incoherent radar with a typical square lay detector, however, the total signal amplitude given by Eq. 1 is squared, and so the detected intensity (or power) is given by $$I = a_1^2 + a_2^2 + 2a_1 a_2 \cos [2\pi(f_2 - f_1)t] \qquad \text{(Eq. 2)}$$

Thus the signal power is seen to be comprised of a constant or D.C. term with power $(a_1^2 + a_2^2)$ and a fluctuating term having power $2a_1 a_2$ and frequency $F = f_2 - f_1$. When $a_1 = a_2$ and $f_1 = -f_2$, then the D.C. term has power $2a_1^2$ and the fluctuating component of frequency $F = 2f_1$ has equal power $2a_1^2$. In other words, if we put the signal intensity waveform represented by Eq. 2 through a spectrum analyzer, we would find two frequency components in the spectrum, one at D.C. and the other at $F=2f_1$, both of equal power. This is called the "fluctuation spectrum."

In actual fact each of the beams in FIGURE 1 has breadth and so the Doppler shifts produced by the targets passing through each of the beams is in the form of a spectrum resembling the Gaussian shape of the beams. Depending upon the beam width and spacing, the combined Doppler spectrum for both beams (with targets distributed uniformly through both) is shown in FIGURE 2a for a variety of beam spacing to beam width ratios. Here the ordinate represents the echo power, normalized by multiplication by the standard deviation of the Doppler spectrum for a single beam; the abscissa represents either Doppler frequency divided by the standard deviation or the corresponding normalized Doppler velocity. Corresponding to each of these unmeasurable double-peaked Doppler spectra is a fluctuation spectrum, shown in FIGURE 2b which is measurable with the incoherent radar. Notice that so long as the spacing of the beams ($2\delta$) exceeds the beam width $2\theta_0$ by the ratio 1.2, there is a well defined secondary maximum in the fluctuation spectrum which occurs at essentially the same frequency F as when the beams were considered to be vanishingly thin. Thus the position of the secondary maximum in the fluctuation spectrum is again a unique measure of the wind.

For the purposes of clarity, one should consider the nature of the Doppler and fluctuation spectra for a single real beam. The real single beam may be considered to be comprised of a number of vanishingly thin beams, each receiving somewhat smaller power than that received on its axis. Thus, there is echo power distributed to either side of the beam axis, and so this power is returned at Doppler frequencies different from that corresponding to the beam axis. The wider the beam, the wider will be the Doppler frequency spread of the returned power, i.e., the broader the Doppler spectrum. Similarly, echoes returning on one side of the real beam with a particular Doppler frequency will beat with those returning simultaneously at all other parts of the real beam. Thus, there will be a variety of fluctuation frequencies in the fluctuation spectrum. Indeed, it is readily shown that the variance of width of the fluctuation spectrum is precisely twice that of the Doppler spectrum (see Atlas, D., Advances in Radar Meteorology, Advances in Geophysics, vol. 10, Academic Press, New York, 1964). Moreover, just as the difference in Doppler frequencies between the two vanishingly thin beams is related to the strength of the cross-wind component, the width of the Doppler spectrum for the signal real beam will be proportional to the cross-wind.

Clearly then the breadth of the Doppler spectrum, and thus of the fluctuation spectrum, on a single beam is related to the cross-wind speed W. Thus, it might be suggested that the breadth of the fluctuation spectrum on a single beam be used as a measure of W. Indeed this is the basis for an airborne radar Doppler navigator using echoes from the ground to measure ground speed (and drift angle) of an aircraft. Unfortunately the same principle cannot be employed in the case of meteorological targets since the breadth of the Doppler spectrum is influenced also by other factors such as turbulence, wind shear, and particle fall speeds. In the present invention, the effect of these contaminating factors in broadening the Doppler spectrum is equivalent to boradening the two beam widths. Thus, while the sharpness of the secondary peak in the fluctuation spectrum is reduced, its position is essentially unaltered. This is seen in FIGURE 2b where the abscissa is plotted in terms of $F/\sigma_F$, where $\sigma_F$ is the standard deviation of the Doppler spectrum. This is yet another advantage of the present invention. It is not readily effected by contaminating factors contributing to broadening of the fluctuation spectrum.

Through mathematical analysis it has been found (Atlas and Wexler, "Wind measurement by Conventional Radar with a Dual Beam Pattern," published in Proceedings of the World Conference on Radio Meteorology, September 1964 and also published in the "Journal of Applied Meteorology," vol. 4, No. 5, pp. 598–606) that a well defined peak will occur in the fluctuation spectrum as long as $(\sin \delta) \geq (2\Sigma/W)$ where $\delta$ is half the beam spacing. W is the speed to be measured, and $\Sigma$ is the total standard deviation of the Doppler spectrum due to all factors, including beam width plus contaminating effects. Since typical values of $\Sigma$ are around 60 cm./sec., Table 1 lists the beam spacing required to measure various wind speeds.

TABLE 1.—MINIMUM BEAM SEPARATIONS AT DIFFERENT WIND SPEEDS FOR DETECTION OF SECONDARY MAXIMUM IN THE FLUCTUATION SPECTRUM FOR $\Sigma=60$ cm./sec.

|  | Wind Speed (m./sec.) | | | | |
| --- | --- | --- | --- | --- | --- |
|  | 10 | 20 | 30 | 40 | 50 |
| Beam Separation (deg.) | 13.9 | 6.9 | 4.6 | 3.5 | 2.8 |

Clearly, the lower wind speeds required rather large beam spacings, and so the latter will usually be restricted to measurements at short ranges where both beams are likely to contain targets simultaneously and the wind may be assumed to be constant from one to the other.

Clearly, when the beams are adjacent to one another in the horizontal plane, the horizontal wind may be measured. The beams may also be directed so that the axis of the beam pair is vertical. In this instance, the horizontal wind speed may be determined by measuring the fluctuation spectrum as one rotates the plane of the beam pair in azimuth to maximize the fluctuation frequency. By doing so slowly as the fluctuation spectrum is sampled at each altitude, a vertical profile of the horizontal wind may be obtained. On the other hand, when the beams are disposed vertically one above the other, updraft and downdraft speed may be measured. This is a vital meteorological measurement in severe storms which cannot now be accomplished by any other means.

If the radar is coherent and the Doppler spectrum itself can be measured, then as is clear from FIGURE 2a, the center of the spectrum is a measure of the radial component of velocity while the spacing between the two peaks is a measure of the tangential component. That is, the actual wind velocity component can be separated vectorially into a component across the bi-sector of the two beams, and one along that bi-sector. In that case, the double peaked Doppler spectra would be centered on a Doppler frequency corresponding to the radial component of the wind just as the normal Doppler spectrum of a single beam radar is centered on the radial component. There is no radial component, and so the Doppler spectra are centered at zero Doppler frequency. Clearly, the spacing of the two peaks in the Doppler spectrum remains a measure of the cross-beam wind component as previously explained while the center of the spectrum is a measure of the radial component. These two components then define the magnitude and direction of the total wind vector. In comparison, present conventional Doppler radars can only measure the radial wind component.

The concept of the present invention is rather broad and should not be restricted by too specialized embodiments. Therefore there is shown only a very general embodiment in FIGURE 3. There antenna 11, having a dual beam radiation pattern, receives RF energy from transmitter 12. Echoes from particles distributed through both beams are returned via antenna 11 to receiver 13 where they are mixed with one another. If the transmitter is pulsed, then the receiver must be range gated by range gate 16 in order that the measurements correspond to a particular range. If the transmitter is continuous wave (CW) then the target itself does the ranging. (With CW systems the method works only when the targets have small dimensions radially.) The video signal appearing at video detector 14 then fluctuates according to a prescribed intensity fluctuation spectrum determined by the beam width, beam spacing, and cross-wind speed as shown earlier in FIGURE 2b. Fluctuation analyzer 15 is intended to measure either the entire fluctuation spectrum or characteristics thereof from which one can determine the fluctuation frequency corresponding to the secondary peak in the spectrum. Most commonly, fluctuation analyzer 15 would be preceded by a box-car circuit to hold the peak amplitude of each echo pulse from one pulse period to the next. Fluctuation analyzer 15 may be comprised either of a spectrum analyzer to measure and record the entire spectrum, or it may be comprised of a combination of fixed and tracking filters so arranged to locate and record the secondary peak in the spectrum, or it may be comprised of a frequency meter or meters so arranged to record the various moments of the fluctuation spectrum such as $\overline{F}$, $\overline{F^2}$, $\overline{F^3}$, etc. which are related to the beam widths, beam spacing, and wind speed. For display of the entire fluctuation spectrum, any one of a large variety of standard audio spectrum analyzers may be used for block 15, either of the single scanning filter-type (as manufactured by the Polarad (Singer) Company, or the General Radio Company), or of the multiple parallel filter bank-type (as manufactured by Raytheon Company.) Obviously, the latter is preferable since the entire spectrum can be obtained more rapidly than with a single scanning filter. On the other hand, since it has been demonstrated (Atlas and Wexler, loc. cit.) that the variance of the fluctuation spectrum is also a measure, (although less accurate), of the cross-wind component, fluctuation analyzer 15 may be comprised of a single capacity couple frequency meter which measures the roof means square frequency of the fluctuating signals. There are such a variety of means of obtaining the fluctuation spectrum or characteristics thereof that further specification of particular means is unnecessary. In practice, antenna 11 is rotated until the fluctuation analyzer indicated a maximum in W and both the direction of the beam pair axis and the value of the W is then recorded. When the beam pair is directed vertically, the plane of the beam pair is rotated until a maximum W is indicated. Of course, the location of the direction of maximum W could be automated by means of a servo-mechanism loop. The particular details are omitted to retain generality. Indeed, fluctuation analyzer 15 may be replaced by an autocorrelator to measure the autocorrelation function corresponding to the spectrum. It is well known that the autocorrelation function is the Fourier transform of the fluctuation spectrum (Lawson and Uhlenbeck, Threshold Signals, MIT Radiation Laboratory Series, vol. 24, published in 1950 by McGraw-Hill Book Co.). Moreover, the autocorrelation functions corresponding to the dual beam fluctuation spectra have been calculated analytically (Atlas and Wexler, loc. cit.) with the result $$\rho(\tau) = \frac{e}{2} - (2\pi\Sigma\tau)^2[1+\cos(2\pi\tau f_o)] \quad \text{(Eq. 3)}$$

Here $\Sigma$ is the total standard deviation of the single beam Doppler spectrum and $Fo = 4\omega\delta/\lambda$, the frequency of the secondary maximum of the dual-beam fluctuation spectrum. Thus, an autocorrelator, comprised of a means of storing consecutive pulse intensity levels $I(t)$ and a means of obtaining the products $I(t)I(t+\tau)$ where $\tau$ is the time log for correlation (as in standard autocorrelators) would also provide a means of determining the cross-wind component.

Figure 4:
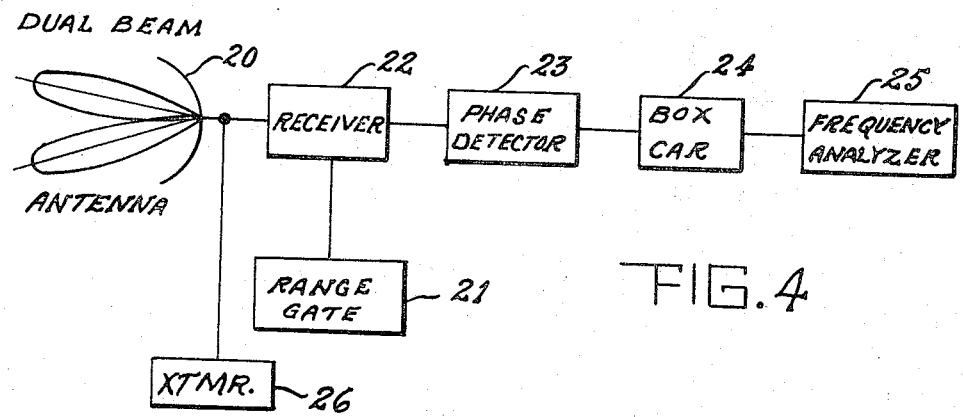
FIGURE 4 shows another embodiment of the present invention which is a dual beam system for Doppler radars.

When the dual beam concept is applied to a pulse Doppler radar, the coherent output of receiver 22 would again be range gated by range gate 21 as in FIGURE 4. The coherent video from phase detector 23 would generally go to box-car 24 by way of phase detector 23 and then to frequency analyzer 25. Frequency analyzer 25 might take one of a variety of forms including a spectrum analyzer to display the entire Doppler spectrum or a combination of filters, frequency trackers, and/or meters to measure both the central frequency (velocity) of the spectrum and the frequency (velocity) spread between the two maxima as illustrated in FIGURE 2a. If it is desired to display the entire Doppler spectrum, then frequency analyzer 25 may comprise any one of a number of standard audio spectrum analyzers either of the single scanning filter-type (manufacturers previously noted) or of the multiple filter-bank-type (manufacturer also previously noted.) In the case of the coherent system the technique illustrated in FIGURE 3 may be utilized to obtain the fluctuation spectrum and obtain a measure of the secondary peak (a measure of the cross-wind W), while that in FIGURE 4 may be used to obtain the central Doppler velocity, thus providing both radial and tangential wind components.

The present invention can also be used without modification to measure the velocity of aircraft. In this case, the dual beam radar is on board the aircraft and the beams are directed toward ground or sea targets instead of precipitation or clouds. If the axis between the beams is directed perpendicularly to the direction of flight with respect to the ground, then both the Doppler spectrum and the fluctuation spectrum of the ground or sea echoes will be almost identical to the corresponding spectra for precipitation echoes as shown in FIGURE 2. The position of the secondary peak in the fluctuation spectrum is then a unique measure of the aircraft velocity relative to the ground. By rotating the antenna to obtain the maximum fluctuation frequency, either of the secondary peak, or of the extreme fluctuation frequency, the operator then determines the direction in which the radar bore-sight axis is normal to the aircraft velocity vector and so determines the true direction of flight. In this way both speed and direction of the aircraft relative to the ground are obtained analogous to the measurements made by sophisticated Doppler navigators. The present invention has the notable advantage of permitting any standard airborne radar, such as the weather and navigational radars with which most large aircraft are commonly equipped, to be modified simply and economically for velocity measurements without resorting to the use of an independent and expensive Doppler navigator.

What I claim is:

1. A method of measuring wind velocities by the utilization of radar return signals from a preselected area including the winds to be measured comprising directing towards said area energy in the form of first and second radar beams having a predetermined angular relationship to each other with the spacing of said beams exceeding the beam width by a predetermined ratio, said beams emanating from a single energy source, receiving radar return signals from said area, mixing return signals from said first beam with return signals from said second beam in a single receiver channel to provide a resulting signal having a fluctuation frequency representative of said wind velocity, said representative signal having a well defined secondary maximum in the fluctuation spectrum, and measuring said secondary maximum in said fluctuation spectrum.

2. A method of measuring horizontal wind velocities and components thereof by the utilization of radar return signals from preselected areas including the winds to be measured comprising directing energy towards said preselected areas in the form of first and second radar beams having a predetermined spacing, the axis of said beams being in the vertical direction, rotating the plane of said beams in azimuth, receiving radar return signals from said preselected area, mixing said radar return signals resulting from said first beam with return signals from said second beam in a single receiver channel to provide a resulting signal having a fluctuation frequency spectrum having a well-defined secondary maximum, and measuring said secondary maximum to provide a signal representative of said horizontal wind velocity.

3. A method of measuring the vertical profile of the horizontal wind velocities for preselected areas including the horizontal winds to be measured comprising directing energy towards said preselected areas in the form of first and second radar beams having a predetermined spacing, the axis of said beams being in the vertical direction, rotating slowly the plane of said beams in azimuth, receiving radar return signals from each altitude as said beams slowly rotate, mixing radar return signals resulting from said first beam with radar return signals from said second beam in a single receiver channel to provide a resulting signal having a fluctuation frequency spectrum with a well-defined secondary maximum, and sampling said fluctuation spectrum at each of said altitudes to provide said vertical profile of said horizontal wind velocities.

4. A method of measuring updraft and downdraft wind velocities for preselected areas comprising directing energy towards said preselected areas in the form of first and second radar beams having a predetermined spacing in accordance with velocities to be measured, said beams being disposed vertically one above the other, receiving radar return signals from said preselected areas, mixing radar return signals resulting from said first beam with radar return signals from said second beam in a single receiver channel to obtain a resulting signal having fluctuation frequencies representative of said updraft and downdraft wind velocities, and measuring said representative signals.

5. A method of measuring the absolute wind velocities of preselected areas, wherein the absolute wind velocities include the radial component and tangential component of the wind velocities comprising directing energy from a coherent radar towards said preselected areas in form of first and second radar beams, receiving radar return signals from said preselected areas, mixing radar return signals resulting from said first beam with radar return signals from said second beam in a single receiver channel to obtain a resulting signal having a double peaked Doppler spectrum, center of the spectrum being a measure of the radial wind component, and the distance between the two peaks being a mesaure of the tangential component, and means for measuring the spectrum characteristic corresponding to these components.

6. A method of measuring the velocity of an airborne object comprising directing energy from said airborne object towards ground targets in the form of first and second radar beams having a predetermined spacing, the axis between said beams being perpendicular to the direction of flight with respect to the ground, receiving radar return signals from said ground targets, mixing radar return signals resulting from said first beam with radar return signals from said second beam in a single receiver channel to obtain a resulting signal having a fluctuation frequency with a well-defined secondary maximum representative of the velocity of said airborne object relative to ground, and measuring said secondary maximum.

7. A system for measuring wind velocities in preselected areas including precipitation and clouds comprising a single radar transmitter, a single antenna providing first and second beams having a predetermined spacing, said antenna being fed by said transmitter, single means also being fed by said transmitter receiving radar returns from said precipitation and clouds, means included in a single receiver channel to mix radar returns resulting from said first beam with radar returns from said second beam to obtain a resulting signal having a fluctuation frequency spectrum with a well-defined secondary maximum representative of said wind velocities, and means to measure said secondary maximum.

8. A system for measuring wind velocities as described in claim 7 further including means to range gate said receiving means.

9. A system for measuring horizontal wind velocities in preselected areas including precipitation and rain comprising single radar transmitter means, single antenna means associated with said transmitter means and providing first and second radar beams having predetermined beam width and spacing ratio, said beams being disposed to be adjacent to one another in the horizontal plane, and directed to said preselected areas, single means associated with said antenna means for receiving radar return signals from said preselected area, means included in a single receiver channel for mixing radar return signals resulting from said first beam with radar return signals from said second beam to provide a resulting signal having a fluctuation frequency spectrum with a secondary maximum representative of said horizontal wind velocities, and means for measuring said secondary maximum.

10. A system for measuring horizontal wind velocities as defined in claim 9 further including means to range gate said receiver means.

11. A system for providing a vertical profile of horizontal wind velocities in preselected areas including precipitation and clouds comprising radar transmitter means, single antenna means associated with said transmitter to provide first and second beams having predetermined spacing and width, the axis of said beams being in the vertical direction with the plane of said beams being rotated in azimuth and directed towards said preselected areas at different altitudes, single means associated with said antenna to receive radar return signals from said preselected areas, means included in a single receiver channel to beat radar return signals resulting from said first beam against radar return signals from said second beam to obtain a resulting signal having a separate fluctuation frequency spectrum representative of the horizontal wind velocities for each altitude, and means to sample said fluctuation spectrum at each altitude to provide said vertical profile.

12. A system for measuring updraft and downdraft wind velocities in preselected areas including precipitation and clouds comprising radar transmitter means, single antenna means associated with said transmitter means to provide first and second radar beams having predetermined spacing and width with said beams being disposed vertically one above the other, said beams being directed towards said preselected areas, single means associated with said antenna means for receiving radar return signals from said preselected areas, means included in a single receiver channel to mix radar return signals resulting from said first beam with radar return signals from said second beam to provide a resulting signal having a fluctuation frequency spectrum with a secondary maximum representative of said updraft and downdraft wind velocities, and means to measure said secondary maximum.

13. A system for measuring wind velocities in preselected areas including precipitation and clouds comprising radar transmitter means, single antenna means associated with said transmitter to provide first and second beams having predetermined spacing and width with the axis of said beams directed vertically towards said preselected areas, means to receive radar returns from said preselected areas, means included in a single receiver channel to beat radar return signals resulting from said first beam against radar return signals from said second beam to obtain a resulting signal having a fluctuation frequency spectrum with a secondary maximum representative of said wind velocities, and means to measure said secondary maximum while rotating the plane of said beams until a maximum wind velocity is indicated thereupon.

14. A system for measuring absolute wind velocities including radial and tangential components for preselected areas including precipitation and clouds comprising a Doppler radar including transmitter means, single antenna means associated with said transmitter means to provide first and second radar beams having predetermined spacing and width, said beams being directed towards said preselected areas, single means associated with said antenna means to receive return signals from said preselected areas, means included in a single receiver channel to mix return signals from said first beam with return signals from said second beam to provide a resulting signal having a frequency spectrum with a central frequency and also two maxima, said central frequency being representative of said radial component and the spread between said maxima being representative of said tangential component, and means to measure said central frequency, and said maxima spread.

15. A system for measuring absolute wind velocities as defined in claim 14 wherein said mixing means consists of a phase detector.

16. A system for measuring absolute wind velocities as defined in claim 15 further including means to range gate said receiver means.

17. A system for measuring absolute wind velocities as defined in claim 16 further including box car means interposed between said phase detector and said measuring means.

18. A system for measuring the velocity of an airborne object such as an aircraft comprising airborne transmitter means, single antenna means associated with said transmitter to provide first and second beams having predetermined width and spacing, said beams being directed towards the ground, single means associated with said antenna means to receive return signals from said ground, means included in a single receiver channel to mix return signals resulting from said first beam with return signals from said second beam to provide a resulting signal having a fluctuation frequency spectrum with a secondary maximum representative of the velocity of said airborne object relative to ground, and means to measure said secondary maximum.

19. A system for measuring the velocity and true direction of flight of an airborne object such as an aircraft comprising an airborne Doppler radar, single transmitter means associated with said radar, single antenna means associated with said transmitter means to provide first and second beams having predetermined width and spacing, the axis between said beams being directed perpendicularly to the direction of flight of said airborne object with respect to ground, single means associated with said antenna means included in a single receiver channel to receive radar return signals, means to mix radar return signals resulting from said first beam with radar return signals from said second beam to provide a resulting signal having a fluctuation frequency spectrum with a secondary maximum representative of said aircraft velocity relative to ground, means to measure said secondary maximum, and means to rotate said antenna means to obtain an extreme frequency fluctuation being representative of said true direction of flight.

References Cited
UNITED STATES PATENTS

| | | | |
|---|---|---|---|
| 2,422,064 | 6/1947 | Anderson | 343—8 |
| 2,669,710 | 2/1954 | Sherr | 343—8 |

RODNEY D. BENNETT, *Primary Examiner.*

R. E. BERGER, *Assistant Examiner.*